(12) United States Patent  
Desrochers

(10) Patent No.: US 8,930,029 B2  
(45) Date of Patent: Jan. 6, 2015

(54) METHODS AND APPARATUS FOR DIFFERENTIAL ENERGY BASED AIRSIDE ECONOMIZER CHANGEOVER

(71) Applicant: Aircuity, Inc., Newton, MA (US)

(72) Inventor: Eric M. Desrochers, Merrimack, NH (US)

(73) Assignee: Aircuity, Inc., Newton, MA (US)

( * ) Notice: Subject to any disclaimer, the term of this patent is extended or adjusted under 35 U.S.C. 154(b) by 0 days.

(21) Appl. No.: 14/246,308

(22) Filed: Apr. 7, 2014

(65) Prior Publication Data

US 2014/0216707 A1 Aug. 7, 2014

Related U.S. Application Data

(62) Division of application No. 13/178,600, filed on Jul. 8, 2011, now Pat. No. 8,725,300.

(51) Int. Cl.
| | | |
|---|---|---|
| G05B 13/00 | (2006.01) | |
| F24F 11/00 | (2006.01) | |
| F24F 7/08 | (2006.01) | |
| G05B 13/02 | (2006.01) | |

(52) U.S. Cl.
CPC ............... *F24F 11/0008* (2013.01); *F24F 7/08* (2013.01); *F24F 11/0015* (2013.01); *F24F 11/006* (2013.01); *G05B 13/024* (2013.01); *F24F 2011/0006* (2013.01); *F24F 2011/0016* (2013.01); *F24F 2011/0064* (2013.01); *F24F 2011/0075* (2013.01)
USPC .......................................................... 700/276

(58) Field of Classification Search
CPC ..... F24F 11/0008; F24F 7/08; F24F 11/0015; F24F 11/006; G05B 13/024
USPC .......................................................... 700/276
See application file for complete search history.

(56) References Cited

U.S. PATENT DOCUMENTS

| | | | | |
|---|---|---|---|---|
| 3,949,607 A | * | 4/1976 | Nodolf | 374/109 |
| 3,979,922 A | * | 9/1976 | Shavit | 62/97 |
| 4,182,180 A | * | 1/1980 | Mott | 374/109 |
| 4,186,564 A | * | 2/1980 | Myers | 62/180 |
| 4,312,226 A | | 1/1982 | Adams et al. | |
| 4,362,026 A | * | 12/1982 | Miller | 62/176.6 |
| 4,457,357 A | * | 7/1984 | Van Arnhem | 165/224 |
| 5,276,630 A | * | 1/1994 | Baldwin et al. | 700/276 |
| 5,791,408 A | | 8/1998 | Seem | |
| 6,125,710 A | * | 10/2000 | Sharp | 73/863.31 |
| 7,421,911 B2 | * | 9/2008 | Desrochers et al. | 73/863.03 |
| 7,434,413 B2 | * | 10/2008 | Wruck | 62/126 |
| 7,890,215 B2 | * | 2/2011 | Duncan | 700/276 |
| 2009/0210096 A1 | * | 8/2009 | Stack et al. | 700/278 |
| 2010/0083682 A1 | * | 4/2010 | Koehler et al. | 62/262 |
| 2010/0126208 A1 | * | 5/2010 | Stammer et al. | 62/419 |

OTHER PUBLICATIONS

U.S. Appl. No. 13/178,600, filed Jul. 8, 2011, Desrochers.

(Continued)

*Primary Examiner* — Mohammad Ali  
*Assistant Examiner* — Sivalingam Sivanesan  
(74) *Attorney, Agent, or Firm* — Daly, Crowley, Mofford & Durkee, LLP

(57) ABSTRACT

Methods and apparatus for controlling an economizer in a ventilation system based upon moisture related properties of a first input air source and a second input air source to minimize energy for conditioning air in a structure.

10 Claims, 10 Drawing Sheets

(56) References Cited

OTHER PUBLICATIONS

Steven T. Taylor, P.E., C. Hwakong Cheng, "Economizer High Limit Controls and Why Enthalpy Economizers Don't Work", Nov. 2010, ASHRAE Journal, pp. 1-11.

PCT Search Report and Written Opinion of the ISA; mailed Jul. 20, 2012; for PCT Pat. App. No. PCT/US2012/038322; 10 pages.

European Application No. 12723351.8 Response to Office Action dated Aug. 29, 2014, 43 pages.

Notification Concerning Transmittal of International Preliminary Report on Patentability (Chapter I of the Patent Cooperation Treaty), PCT/US2012/038322, date of mailing Jan. 23, 2014, 8 pages.

U.S. Appl. No. 13/178,600, filed Jul. 8, 2011, IFW downloaded May 22, 2014, 168 pages.

* cited by examiner

METHODS AND APPARATUS FOR DIFFERENTIAL ENERGY BASED AIRSIDE ECONOMIZER CHANGEOVER

CROSS REFERENCE TO RELATED APPLICATIONS

The present application is a divisional application of U.S. patent application Ser. No. 13/178,600, filed on Jul. 8, 2011, entitled: METHODS AND APPARATUS FOR DIFFERENTIAL ENERGY BASED AIRSIDE ECONOMIZER CHANGEOVER, which is incorporated herein by reference in its entirety.

STATEMENT REGARDING FEDERALLY SPONSORED RESEARCH

Not Applicable,

FIELD OF THE INVENTION

The present invention relates generally to the energy efficient operation of a ventilation and air conditioning system and, more particularly, to systems and methods for determining when outside air can be used to lower mechanical cooling energy requirements.

BACKGROUND OF THE INVENTION

The use of outside air to reduce mechanical cooling requirements of building ventilation and air conditioning systems is well known in the art and has been an integral part of ventilation system design involving air handler units (AHUs) packaged rooftop units (AHUs), hereafter referred to as AHUs.

Regardless of geographic location, most commercial buildings require cooling during each season, due to the large heat gains realized within a typical facility, and this cooling requirement can have a significant impact on operating costs. In many geographic locations, however, especially during the cooler or more temperate months of the year, these cooling needs can be offset by way of an airside economizer. An airside economizer (hereafter referred to as an "economizer") is a system that typically incorporates a linked damper assembly (mechanically connecting together the outside, return, and building exhaust dampers common to an air handler) or dampers that are controlled in unison through other control means, and control logic that determines the amount of outside air to introduce in order to reduce mechanical cooling needs. If done properly, the result can lead to substantial energy savings. Given these benefits, ASHRAE standard 90.1-2010 ("Energy Standard for Buildings Except Low-Rise Residential Buildings") lists the airside economizer as a conditional requirement (assuming a water-side economizer is not specified) for systems having a cooling capacity of 54,000 Btu/h or more.

In order to determine when conditions are suitable for operating the economizer, a means of sensing the "heat" or energy level present in the outside air and, often times, return air is applied which, as known in the art, may involve one of several control strategies including: fixed dry-bulb temperature measurement, dual or differential dry-bulb measurement, fixed enthalpy measurement, dual or differential enthalpy measurement, or combinations of these measurement strategies. Each of these approaches is well known to those of ordinary skill in the art. In particular, well known conventional techniques involve measuring the enthalpy of the AHU return air and comparing it to that of the outside air. Using this technique, employing this "differential enthalpy" measurement, the economizer is enabled when the return air enthalpy exceeds that of the outside air. An example of a commercially available sensor product used for this purpose includes the Honeywell C7400A1004.

U.S. Pat. No. 4,362,026, which is incorporated herein by reference, is a further example of the use of an enthalpy measurement to provide what is known as a "lockout" or "changeover" function. In general, systems and methods used to assess when it is appropriate to enable an economizer are commonly referred to as economizer high limit controls. Still further, U.S. Pat. No. 4,182,180, which is incorporated herein by reference, discloses an approach to measuring enthalpy.

In addition, the lockout function or high-limit controls may include additional lockout settings that automatically disable the economizer when the outdoor air dry-bulb temperature goes above or below pre-determined values in order to provide freeze protection when outdoor conditions become very cold and, for fixed dry-bulb or differential dry-bulb economizers, to prevent the introduction of air that is too moist at higher temperatures.

When a system is equipped with an economizer, savings can be realized on the cooling costs associated with the load posed by return air, because the economizer acts by increasing the outdoor air percentage to the building when it requires less energy, and therefore is more economical to use the outdoor air in lieu of the return air. In essence, an economizer incorporates a damper system that controls outside air and return air in an inverse fashion: as the outside air volume (flow rate) is increased the return air volume is decreased by the same amount.

FIG. 1 illustrates the heating and cooling operation of a typical prior art AHU with an economizer which generally involves four functional modes that are dependent on the thermal demand for heating or cooling and the suitability of using outside air for cooling purposes.

In region "A" the outdoor air temperature is below a point where, for the minimum setting of the outdoor air damper the resultant air mixture at the intake of the Air Handler Unit (AHU) has to be heated in order to realize the desired AHU discharge air temperature (typically 55° F.). The operating state of the system in this region, generally involves an active heating coil at the AHU. The boundary between Region A and Region B is often referred to in the art as the pivot point temperature of the building, and is the normal point at which the outdoor air temperature is sufficiently low to require heat to be added at the AHU. This is the case whether there is an economizer or not. Notice that if the outdoor air percentage is reduced it will increase the operative free cooling range, which can add to the energy savings. There is a practical limit to this, however, as many buildings are designed with an outdoor air preheat system that will turn on when outdoor air temperatures are below freezing. With such systems the economizer will be shut off under these conditions. When preheat is applied, significant energy savings can be realized by lowering the outdoor air percentage, since it will directly reduce the load on the preheat coil.

In region "B" the outdoor air damper is automatically adjusted to provide the correct mixture with return airflow to satisfy all of the cooling demand imposed by the return air. Because of this, this is referred to as "free cooling", since the AHU cooling coil will be off in that mode. However, as the outdoor air percentage is increased the free cooling range will decrease and the added load due to sensible and especially latent heat can become a major factor in total energy costs at higher outdoor air temperatures.

Region "C" of FIG. 1 signifies the range where mechanical cooling is applied and the system is operating at 100% outdoor air. This is also known as the assisted cooling range, where energy savings is realized, even though mechanical cooling is applied, because in this range less cooling is required to condition outdoor air than that for return air.

The boundary between region C and region D is the point at which assisted, cooling with outdoor air becomes non-economical due primarily to the latent energy realized at these higher temperatures. With a dry bulb economizer this is typically taken to be 65° F. to 70° F., conditional on geographic location, but can be lower based on the actual return air temperature. However, variations in both return air latent energy, as well as that of outside air, often makes economizers based only on dry bulb or differential dry bulb ineffective, often realizing only a fraction of the potential savings, as well as being potential wasters of energy. In order to be effective, the economizer control function needs to account for latent heat and, when this is done properly, typically using an enthalpy measurement, an optimal switchover point can be provided to yield good energy savings.

Although the differential enthalpy approach can yield the most energy savings, historically, this approach has had several major issues which can lead to energy inefficiency. First, the poor accuracy of most commercial sensors used to provide an enthalpy measurement can result in errors in the economizer logic, causing the economizer to be enabled under inappropriate conditions, as well as not being enabled when it would be beneficial. This is due to stability issues with the hygroscopic materials, such as nylon that have been historically used to form these sensors. (More recently, solid state humidity sensors have become much more reliable, and they can be accurate over a limited range.) These errors are exacerbated by stacking sensor tolerances when a differential enthalpy signal (requiring a separate sensor for both the return air and outside air) is sought after. These errors typically are known to increase as the sensors age.

These errors can be substantially reduced when one utilizes a Shared sensor multipoint sampling system to make these measurements. In these systems a sensor, or a single set of multiple sensors, may be used to sense a plurality of locations. For one class of these systems, multiple tubes may be used to bring air samples from multiple locations to a centralized sensor(s). Centrally located air switches and/or solenoid valves may be used in this approach to sequentially switch the air from these locations through the different tubes to the sensor to measure the air from the multiple remote locations. These octopus-like systems sometimes known as star-configured or home run systems use considerable amounts of tubing. An example of such a star-configured system is described in U.S. Pat. No. 6,241,950, which is incorporated herein by reference. Other types of systems known to the art of air monitoring include those that are designed to monitor refrigerants and other toxic gases, which also are star-configured systems.

An exemplary shared sensor multipoint sampling system known as a Networked Air Sampling System, is described in U.S. Pat. No. 6,125,710, which is incorporated herein by reference. Further, U.S. Pat. No. 7,421,91,182 describes an exemplary duct probe assembly system that can be used in conjunction with a shared sensor multipoint sampling system, such as that described within U.S. Pat. No. 6,125,710, in order to create enthalpy signal that is precise and not subject to many of the accuracy errors common to discrete enthalpy sensors. The combined teachings of U.S. Pat. Nos. 6,125,710 and 7,421,911 can be applied to greatly improve the performance of a differential enthalpy economizer.

Even with the aforementioned benefits afforded by utilizing a multipoint sampling system, the performance of a differential enthalpy economizer can be further hampered when either the return air or outside air enthalpy measurement become non representative of the cooling load that each would present to the AHU cooling coil. For example, FIG. 2 is a psychrometric chart that illustrates two different conditions where the outside air enthalpy is higher than that of the building's return air. The conditions represented by the outside air and return air states OA#1 and RA#1, respectively, are both conditions that will involve both latent and sensible cooling, because the process of cooling each air source to the shown supply air condition (SA#1) involves both a dry-bulb temperature change, as well as a dewpoint temperature change. Because there is a dewpoint temperature change for each, the cooling process for both RA#1 and OA#1 both result in a "wet-coil" condition. This is because to cool either to the supply air state SA#1, water must be removed from the air. In this case, using enthalpy to determine which air source (OA#1 or RA#1) requires more cooling would be an accurate way to gage whether or not to enable the economizer. In this case, since the return air enthalpy is lower than that of the outside air, the economizer should be disabled. The conditions represented by the outside air and return air states OA#2 and RA#2, respectively, are both conditions that will only involve sensible cooling, because the process of cooling each air source to the shown supply air condition (SA#2 and SA#3) involves only a dry-bulb temperature change. In this particular case, however, even though the enthalpy of the outside air state OA#2 is higher than that of the return air state RA#2 it will actually take less energy to cool the outside air. This is because the energy required to cool OA#2 and RA#2 to the supply air state SA#2 is proportional only to the thy-bulb temperature change. This is referred to as a "thy-coil" condition for each. Therefore., in this ease, if enthalpy were used to evaluate each, the economizer would be incorrectly disabled.

There have been attempts to correct for this effect of improperly using differential enthalpy under dry-coil conditions. For example, U.S. Pat. No. 4,312,226 partially corrects for this effect by locking out the economizer if the outdoor air enthalpy is lower than that of the return air, but the outside air temperature is higher than that of the return air. This can be disadvantageous in that it will not enable the economizer under many appropriate dry-coil conditions.

A solid state "electronic enthalpy" controller, such as the H705A made by Honeywell Corporation, provides compensation for dry-coil versus wet coil conditions, based on assumed response curves for combinations of relative humidity and dry-bulb temperature that may be selected based on operating conditions. Each response curve defines the conditions where the economizer will be enabled/disabled and different curves may he selected, for different geographic location and supply air conditions. The performance of electronic enthalpy controls such as this are limited in that they provide a fixed curve to which outside air is compared and, they do not account for variations in return air conditions, as well as supply discharge air temperature conditions, which can greatly influence when enabling an economizer will save energy. It is well known to those of ordinary skill in the art of ventilation system design that many ventilation systems are designed around 55 degF. supply discharge air conditions. However, as a practical matter, the temperature that the supply air from an AHU is controlled to can be varied up from 55 degF. to help reduce heating load during cooler times of the year and down from 55 degF. to help improve cooling effectiveness during warmer seasons. As a result, high limit controls based on the fixed curve provided by this type of electronic enthalpy controllers can lead to inefficient economizer operation, due to energy waste that can result when enabling the economizer under incorrect conditions.

It should be further stated that prior art approaches (fixed dry-bulb, differential dry-bulb, fixed enthalpy, differential enthalpy, and electronic enthalpy) to providing an economizer lockout or changeover function are hampered in part by their limitations in accurately representing which airstream (return air or outside air) poses the least total cooling load on the AHU, including both latent and sensible cooling. This is particularly the case during warmer outside air conditions, but it is also hampered by the fact that return air conditions within a building, as well as that of different types of buildings, can vary considerably. For example, high occupant density in a facility can result in significant moisture content within return air, resulting in a wet coil condition (latent cooling) at the AHU, even though outside air conditions would not result in latent cooling. This condition where one air source is subject to latent and sensible cooling while the other is subject to only sensible cooling is particularly problematic, given that even the prior art attempts at compensating for dry-coil versus wet coil conditions (such as for example with the electronic enthalpy approach) would be best suited for conditions where, at a given instance, both air sources would result in the same coil conditions (dry or wet).

This, however, is often not the case and it is a disadvantageous aspect of prior art economizer changeover approaches, leading to energy waste.

SUMMARY OF THE INVENTION

The present invention provides methods and apparatus for enabling an economizer during conditions where the outside air enthalpy is higher than that of the return air, but yet, because only sensible cooling will take place, the cooling load placed on an Air Handler Unit (AHU) by the outside air is less than that of the return air. While exemplary embodiments are shown and described in conjunction with particular configurations and applications, it is understood that embodiments of the invention are applicable to cooling applications in general in which it is desirable to optimize use of an economizer In one aspect of the invention, a method of controlling an economizer in a ventilation system comprises measuring a moisture related property of the first input air source to determine if conditioning of the first air source to a desired output air temperature results in a wet-coil or a dry-coil condition, measuring a moisture related property of the second input air source to determine if conditioning of the second air source to the desired output air temperature results in a wet-coil or a dry-coil condition, determining a measure indicative of energy associated with the conditioning of the first input air source for the wet-coil condition and for the dry-coil condition, determining a measure indicative of energy associated with the conditioning of the second input air source for the wet-coil condition and for the dry-coil condition, wherein the measure indicative of energy for the first and second input air sources includes sensible energy change associated with the conditioning of the first and second air sources when the dry-coil condition is determined and, includes sensible and latent energy change associated with the conditioning of the first and second air sources when the wet-coil condition is determined, wherein the measure indicative of energy for the first and second air sources has the same units for both the wet-coil condition and the dry-coil condition, comparing the measure indicative of energy associated with the conditioning of the first air source and the measure indicative of energy associated with the conditioning of the second air source to determine which of the first and second input air sources applied to an air handler requires the least amount of energy for the conditioning, and selectively enabling the economizer based upon the comparison of which of the first and second input air sources applied to an air handler requires the least amount of energy for the conditioning.

The method can further include one or more of the following features: the measure indicative of energy comprises energy rate as a function of volumetric flow rate, the first input air source includes return air and the second input air source includes outside air, the moisture related property comprises dewpoint temperature, the moisture related property comprises humidity ratio, the desired output temperature is determined as supply temperature setpoint, and/or the desired output temperature is determined as measured supply dry-bulb temperature.

In another aspect of the invention, a method of controlling an economizer in a ventilation system comprises measuring a moisture related property of a first input air source to determine if conditioning of the first input air source to a desired output air temperature results in a wet-coil or a dry-coil condition, measuring a moisture related property of a second input air source to determine if conditioning of the second input air source to the desired output air temperature results in a wet-coil or a dry-coil condition, determining a moisture related lockout value and a dry-bulb temperature lockout value based or a cooling load presented by the first input air source, comparing the measured moisture related property of the second input air source to the moisture related lockout value if the conditioning of the second input air source results in a wet-coil condition, comparing the measured dry-bulb temperature of the second air source to the dry-bulb temperature lockout value if the conditioning of the second air source results in a dry-coil condition, and selectively enabling the economizer based upon the comparisons to the moisture related lockout value and the dry-bulb temperature lockout value.

The method can further include one or more of the following features: the first input air source corresponds to outside air and the second input air source corresponds to return air, the first input air source corresponds to return air and the second input air source corresponds to outside air, the moisture related property of the first and second input air source measured to determine if a wet-coil condition results includes dewpoint temperature, the moisture related lockout value is calculated as the enthalpy value that when compared to an estimate of the supply air enthalpy is indicative of the energy associated with conditioning the first input air source, the measured enthalpy of the second input air source is compared to the enthalpy lockout value, when it is determined that the conditioning of the second input air source results in a wet-coil condition, the first input air source is outside air and the second air source is return air, and the economizer is enabled when the return air enthalpy exceeds the enthalpy lockout value, the dry-bulb temperature related lockout value is calculated such that, when compared to an estimate of the supply air dry-bulb temperature, is indicative of the energy associated with conditioning the first input air source, the measured dry-bulb temperature of the second input air source is compared to the dry-bulb temperature lockout value, when the conditioning of the second input air source results in a dry-coil condition, and/or the first air source is outside air and the second air source is return air, causing the economizer to be enabled when the return air dry-bulb temperature exceeds the dry-bulb temperature lockout value.

In another aspect of the invention, an article comprises a computer readable medium comprising non-transitory stored instructions that enable a machine to control an economizer in a ventilation system, by: receiving a measurement of a moisture related property of the first input air source to determine if conditioning of the first air source to a desired output air temperature results in a we-coil or a dry-coil condition, receiving a measurement of a moisture related property of the second input air source to determine if conditioning of the second air source to the desired output air temperature results in a wet-coil or a dry-coil condition, determining a measure indicative of energy associated with the conditioning of the first input air source for the wet-coil condition and for the dry-coil condition, determining a measure indicative of energy associated with the conditioning of the second input air source for the wet-coil condition and for the dry coil condition, wherein the measure indicative of energy for the first and second input air sources includes sensible energy change associated with the conditioning of the first and second air sources when the dry coil condition is determined and, includes sensible and latent energy change associated with the conditioning of the first and second air sources when the wet-coil condition is determined, wherein the measure indicative of energy for the first and second air sources has the same units for both the wet-coil condition and the dry-coil condition, comparing the measure indicative of energy associated with the conditioning of the first air source and the measure indicative of energy associated with the conditioning of the second air source to determine which of the first and second input air sources applied to an air handler requires the least amount of energy for the conditioning, and generating an enable signal to selectively enable the economizer based upon the comparison of which of the first and second input air sources applied to an air handler requires the least amount of energy for the conditioning.

In another aspect of the invention, a system comprises an economizer, a first sensor to measure a moisture related property of the first input air source, a control module to determine, from the moisture related property of the first input air source, if conditioning of the first air source to a desired output air temperature results in a wet-coil or a dry-coil condition, a second sensor to measure a moisture related property of the second input air source to enable the control module to determine if conditioning of the second air source to the desired output air temperature results in a wet-coil or a dry-coil condition, wherein the control module includes a processor and circuitry to: determine a measure indicative of energy associated with the conditioning of the first input air source for the wet-coil condition and for the dry-coil condition, and to determine a measure indicative of energy associated with the conditioning of the second input air source for the wet-coil condition and for the dry-coil condition, wherein the measure indicative of energy for the first and second input air sources includes sensible energy change associated with the conditioning of the first and second air sources when the dry-coil condition is determined and, includes sensible and latent energy change associated with the conditioning of the first and second air sources when the wet-coil condition is determined, wherein the measure indicative of energy for the first and second air sources has the same units for both the wet-coil condition and the dry-coil condition, compare the measure indicative of energy associated with the conditioning of the first air source and the measure indicative of energy associated with the conditioning of the second air source to determine which of the first and second input air sources applied to an air handler requires the least amount of energy for the conditioning, and selectively enable the economizer based upon the comparison of which of the first and second input air sources applied to an air handler requires the least amount of energy for the conditioning.

BRIEF DESCRIPTION OF THE DRAWINGS

The invention will be more fully understood from the following detailed description taken in conjunction with the accompanying drawings, in which.

DETAILED DESCRIPTION OF THE INVENTION

A ventilation system for a building typically includes one or more air handling units and associated fan systems which, together, perform HVAC functions including: maintaining building pressurization, providing sufficient amounts of fresh air to occupants, controlling moisture levels with the building, controlling airborne dust or particulate levels, and the control of building air temperature.

It is understood that exemplary embodiments of the invention are applicable to any ventilation system that can benefit from the application of an airside economizer. This generally includes, but is not limited to, multiple pass air handling systems, which are also typically referred to as recirculating air systems.

Figure 1:
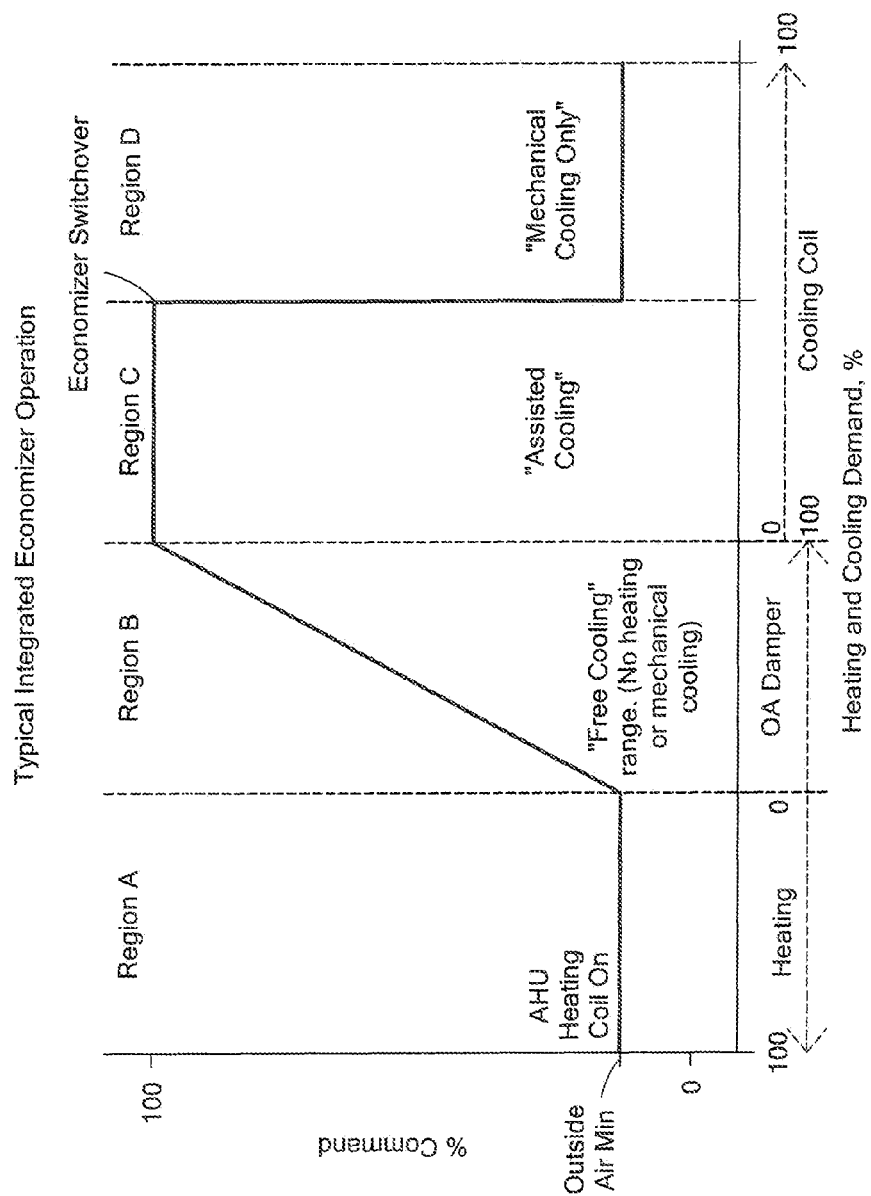
FIG. 1 is a graphical representation of a prior art integrated economizer operation.
Figure 2:
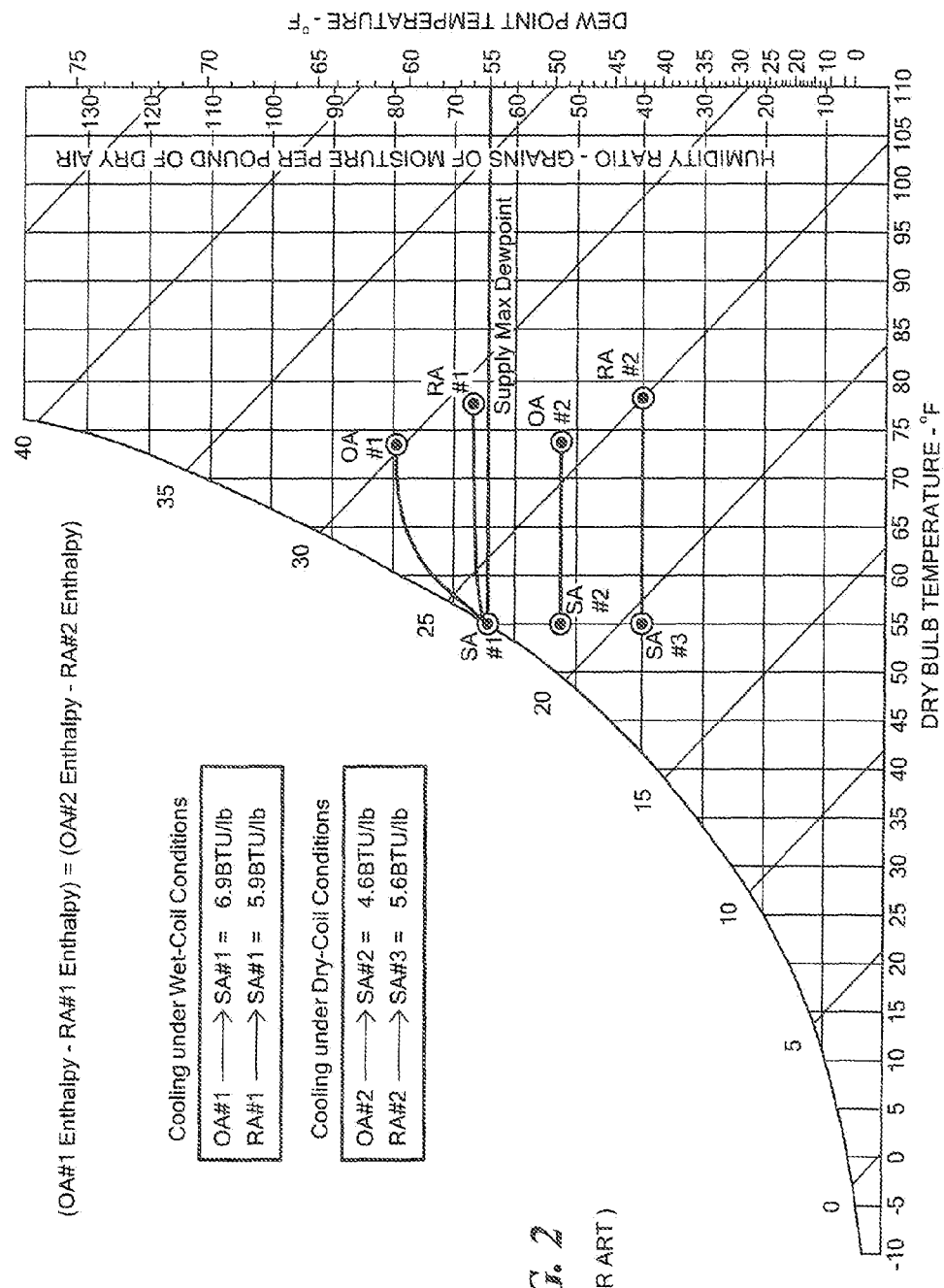
FIG. 2 is a prior art psychrometric chart illustrating two different conditions where the outside air enthalpy is higher than that of building return air.
Figure 3:
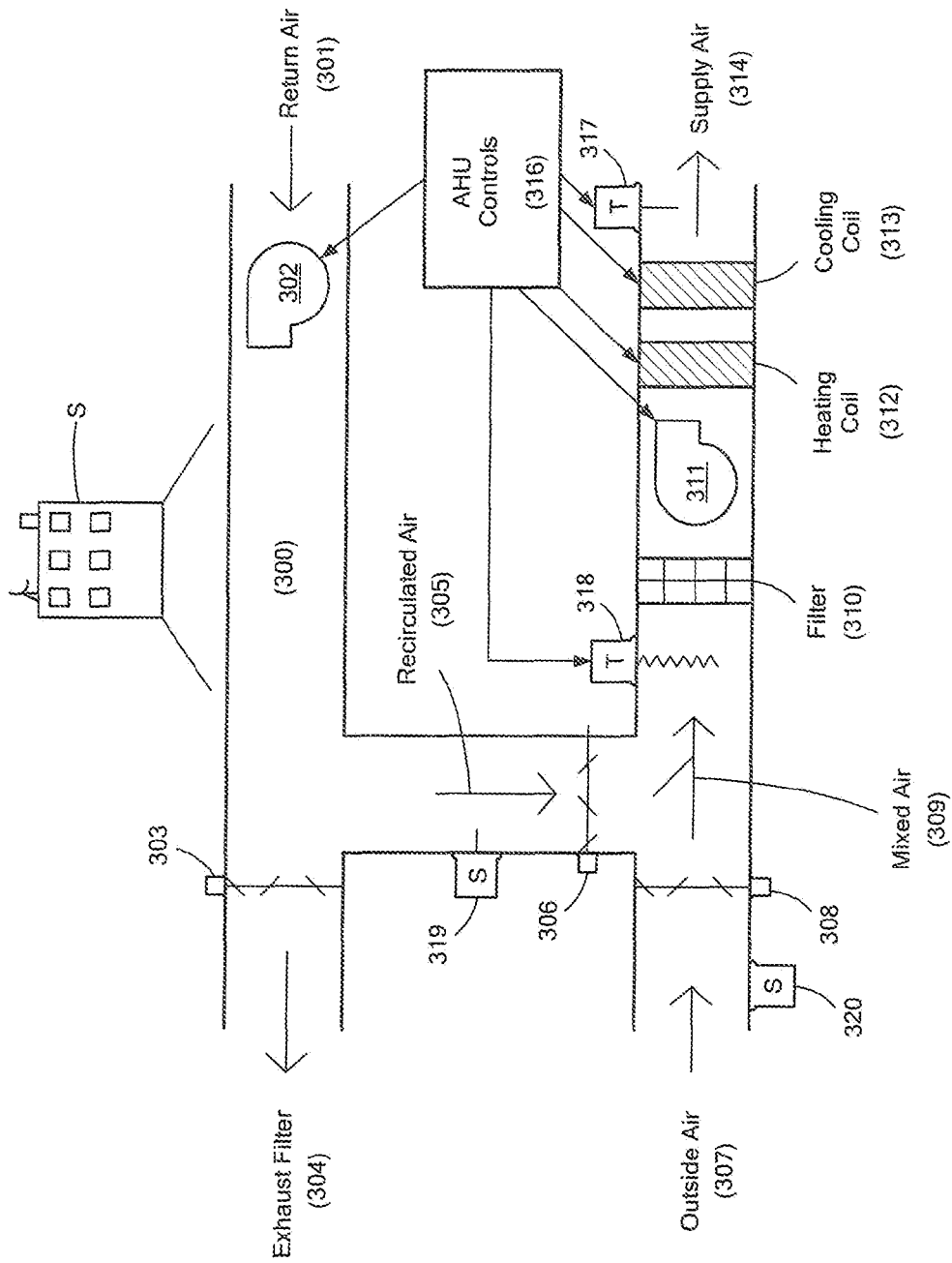
FIG. 3 is a schematic representation of an exemplary ventilation system 100 having economizer control in accordance with exemplary embodiments of the invention.

FIG. 3 shows an exemplary multiple pass air handling system 300 having economizer control in accordance with exemplary embodiments of the invention. The air handling system 300 can form a part of a structure 5, such as a building. The system 300 has a so-called 'H-type' fan system topology, which is a well-known type of multiple pass air handling system. The system 300 supplies conditioned supply air 314 to spaces or rooms that form zones within the building.

It is understood that a given building can have one or more zones and that a single system, such as system 300, can be applied to multiple zones. In other embodiments, systems can be dedicated to a large single zone. It is contemplated that a multiplicity of systems within a building can have multiple zones. It is further understood that the supply to fan 311 may comprise any practical number of supply fans that draw from the same mixed air 309, providing either separate supply air 314 serving different sets of one or more zones. Alternatively, the supply fans 311 may be connected in parallel supplying a common set of zones. Similar variations can apply to the way in which return air fans 302 are connected in a system, in that the one or more return air fans 302 may be connected so that the return air 301 flowing into the one or more return air fans 302 can originate from different sets of one or more zones or the same set of one or more zones. It is understood that the aggregate flowing from the one or more return air fans 302 ultimately combines to form the mixed air 309. In addition, system 300 may include one or more outside air sources 307, which may be derived from one or more locations and combine with an aggregate of recirculated air 305 to form the mixed air 309. Further, the amount of outside air 307 and recirculated air 305 that is combined to form mixed air 309 is controlled by way of damper assemblies 308 and 306, respectively. Generally, as more outside air 307 is introduced by opening damper 308, damper 306 will be closed in a proportionate manner to reduce the recirculated air component 305. Alternatively, as recirculated air component 305 is increased, outside air 307 will be proportionately reduced.

In practice, when, enabled, the economizer function will be implemented using logic within AHU Controls 316, or it may be a separate controller known to the art as a Proportional Integral Derivative or PID controller, or this logic may be performed using a Programmable Logic Controller (PLC). Once an economizer is enabled, it will adjust the mixture of recirculated air 305 and outside air 307 to form mixed air 309 using dampers 306 and 308. This adjustment occurs until the mixed air 309 reaches the desired dry-bulb temperature, measured either by mixed air temperature probe 318 or via supply air temperature sensor 317. If, even after the outside air damper 308 reaches its full-open position, the desired mixed air 309 or supply air 314 temperature is too high, the system will be in its "mechanical assist" mode, in which the cooling coil 313 will be enabled to provide partial cooling to achieve the desired temperature setpoint.

It is understood that the teachings of the present invention are applicable to any ventilation system that could benefit from an airside economizer that is efficiently enabled and disabled. Exemplary ventilation system topologies include, but are not limited to, dual duct supply air systems, recirculating air handling systems with dedicated outside air, and recirculating air handling systems with relief fans.

Again referring to FIG. 3, the ventilation system 300 includes sensor locations 319, 320 to determine latent and sensible heat properties of the return air and the outside air, respectively. Note that although the sensor location 319 pertains to the recirculated air 305, unless stated otherwise, that airstream is substantially the same as the return air 301, which allows us to assume the sensor location 319 is monitoring the return air. It is understood that exemplary embodiments of the invention are not limited to monitoring recirculated air 305 as return air 301, rather, sensor location 319 could be any suitable location within the ventilation system to sample return air 301, including locations on both the inlet and discharge side of return air fan 302.

In general, exemplary embodiments of the invention provide methods and apparatus for determining when conditions are suitable for operating an economizer by establishing comparable measurements using the same units of measurement (one measurement for the return air and one for the outside air) that are indicative of the predicted cooling load placed on the AHU as each air source is separately introduced. An exemplary system determines whether moisture removal takes place as return or outside air is introduced to the AHU, and uses this information to determine whether the measurement indicative of cooling load relates only to sensible cooling or a combination of sensible and latent cooling. If moisture removal is predicted, then the comparable measurement will be indicative of both the sensible and latent energy associated with the cooling process. If moisture removal is not predicted, then the comparable measurement will be indicative of only the sensible energy associated, with the cooling process. In general, the economizer is enabled when the comparable measurement established for the return air is numerically larger than that established for the outside air.

In an exemplary embodiment of the invention, determining whether moisture removal takes place as the air source is introduced is accomplished by either measuring or deriving the dewpoint temperature of the air source and comparing it to the measured supply air discharge temperature. Moisture removal is expected to take place if the dewpoint temperature of the air source numerically exceeds the measured supply air temperature.

Referring again to FIG. 3, sensor locations 319 and 320 can be used to establish dewpoint temperature measurements of the return air stream 305 and outside air 307, respectively. The dewpoint temperature readings can then be individually compared to the dry-bulb temperature of the supply discharge air 314 in order to predict if moisture removal will take place for each air source 305 and 307.

It should be understood that this invention is not restricted to the use of de point temperature to predict if a dry- or wet-coil condition will result. For example, as another embodiment of this invention the measured humidity ratio of each air source 305 and 307 can be compared to the predicted humidity ratio value of the supply air 314. If the measured humidity ratio of an input air source 305 or 307 exceeds the predicted maximum value for the supply air 314, then the conditioning of that air source will result in a wet-coil.

In another embodiment of the invention, determining whether moisture removal takes place as the air source is introduced is accomplished by either measuring or deriving the dewpoint temperature of the air source and comparing it to the expected supply air discharge temperature. The expected supply air discharge temperature is the temperature to which the AHU 316 controls the temperature of supply air 314. This expected temperature is often referred to in the art as the temperature setpoint.

In one embodiment, the sensor locations 319 and 320 are capable of providing either derived or directly measured characteristics of the airstream sufficient to establish, a measurement that is indicative of the dewpoint temperature of the air source, the dry-bulb temperature of the air source, and a measurement that accounts for the moisture-related or latent energy of the air source. In one particular embodiment, each sensor location is capable of producing a measurement or calculation that is processed either locally or remotely that includes: dewpoint temperature, dry-bulb temperature, and enthalpy.

In an exemplary embodiment, remote measurements are made, such as by using a multipoint air sampling system, such the exemplary networked air sampling system described in U.S. Pat. No. 6,125,710 and/or the duct probe assembly system described in U.S. Pat. No. 7,421,911, which are herein incorporated by reference. The teachings of U.S. Pat. No. 6,125,710 enable highly accurate dewpoint temperature measurements to be made with minimal tolerance stacking errors between measured locations, which is useful in exemplary embodiments of the invention, given the comparative function that is performed when assessing which air source (return 305 or outside air 307) poses the least cooling load on the AHU. Further, the teachings of U.S. Pat. No. 7,421,911 are useful for combining the precise remote measurement of dewpoint temperature from the system described in U.S. Pat. No. 6,125,710 and combining it with a local dry-bulb temperature measurement from locations 319 and 320 to produce a highly accurate virtual measurement of enthalpy.

In an exemplary embodiment, the sensor locations 319 and 320 incorporate dry-bulb temperature measurements and moisture related measurements which sense physically different locations of the return or outside air sources 305, 302, 307. For example, this may be appropriate when it is desirable to minimize the number of sensors involved to produce the economizer changeover function and it is desired to use a return air dry-bulb temperature measurement that is being performed for the purpose of another function within the building.

Figure 4:
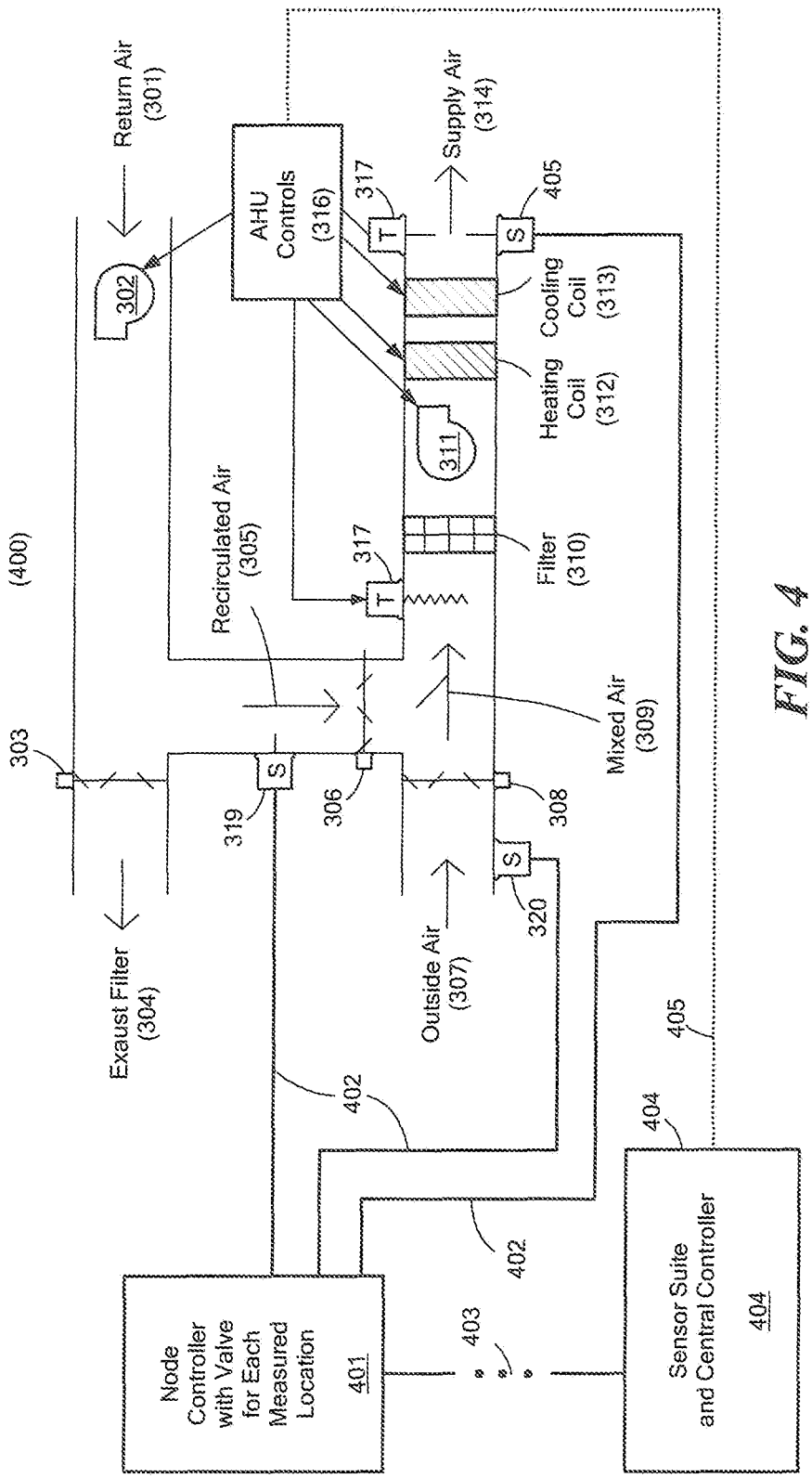
FIG. 4 is a schematic representation of a further exemplary ventilation system 100 having economizer control in accordance with exemplary embodiments of the invention.

FIG. 4 illustrates an exemplary embodiment of a system used to provide the economizer switchover function according to an exemplary embodiment of the invention. In this embodiment the sensor locations 319 and 320 utilize duct probes like those described in U.S. Pat. No. 7,421,911 to provide a dry-bulb temperature measurement at the physical locations where the probes 319 and 320 are mounted. Moisture measurements are performed by a multipoint air sampling system, such as that described in U.S. Pat. No. 6,125,710. In this embodiment, air samples are drawn through structured cable 402, which are sequenced through a node controller 401, conveyed through a common backbone 403, which can be identical or similar to structured cable 402, and sensed via sensor suite 404. An exemplary structured cable 402 and 403 is described in U.S. Pat. No. 7,360,461 B2, which includes tubing that enables air samples to be transported with minimal loss to the properties of interest. In this case the property of interest is the moisture concentration within the air sample that should not degrade or change, as it is conveyed from probes 319 or 320 through the structured cable 402, the node controller 401, and structured cable 403, to the sensor suite 404. Structured cable 402 and 403 also provide power, control, and communications wiring to support the interconnection of the elements of this system, While the sensor suite and central controller 404 are shown as one element in the illustrated embodiment, it is understood that the central controller can be separate from the sensor suite and that there may be any practical number of sensor suites operated by the central controller, which is the main CPU or computer that operates the multipoint air sampling system and may also be the device which performs the logic to determine what the state of the economizer should be. This logic may produce the economizer changeover signal that will be communicated to the economizer controls, In one embodiment, a network connection 405 allows the central controller 404 to communicate with the AHU controls 316, where the AHU controls 316 are responsible for implementing the economizer control function. For example, one method to communicate between ventilation controls and equipment in a building is by way of BACnet, which is the Building Automation and Control Networking protocol specified by the American Society of Heating, Refrigeration and Air Conditioning Engineers (ASHRAE). The network connection 405 can support BACnet communications over a TCP/IP network between central controller 404 and MILT controls 316. Alternatively, the central controller 404 can communicate to the specific economizer controls using a variety of methods, including other networking schemes and analog signals. For example, some AHU types are relatively simple packaged rooftop units (RTUs) that may have separate controls for controlling the economizer function and are capable of interfacing with analog signals or external relays in order to obtain a changeover or lockout signal to enable or disable the economizer.

Figure 5:
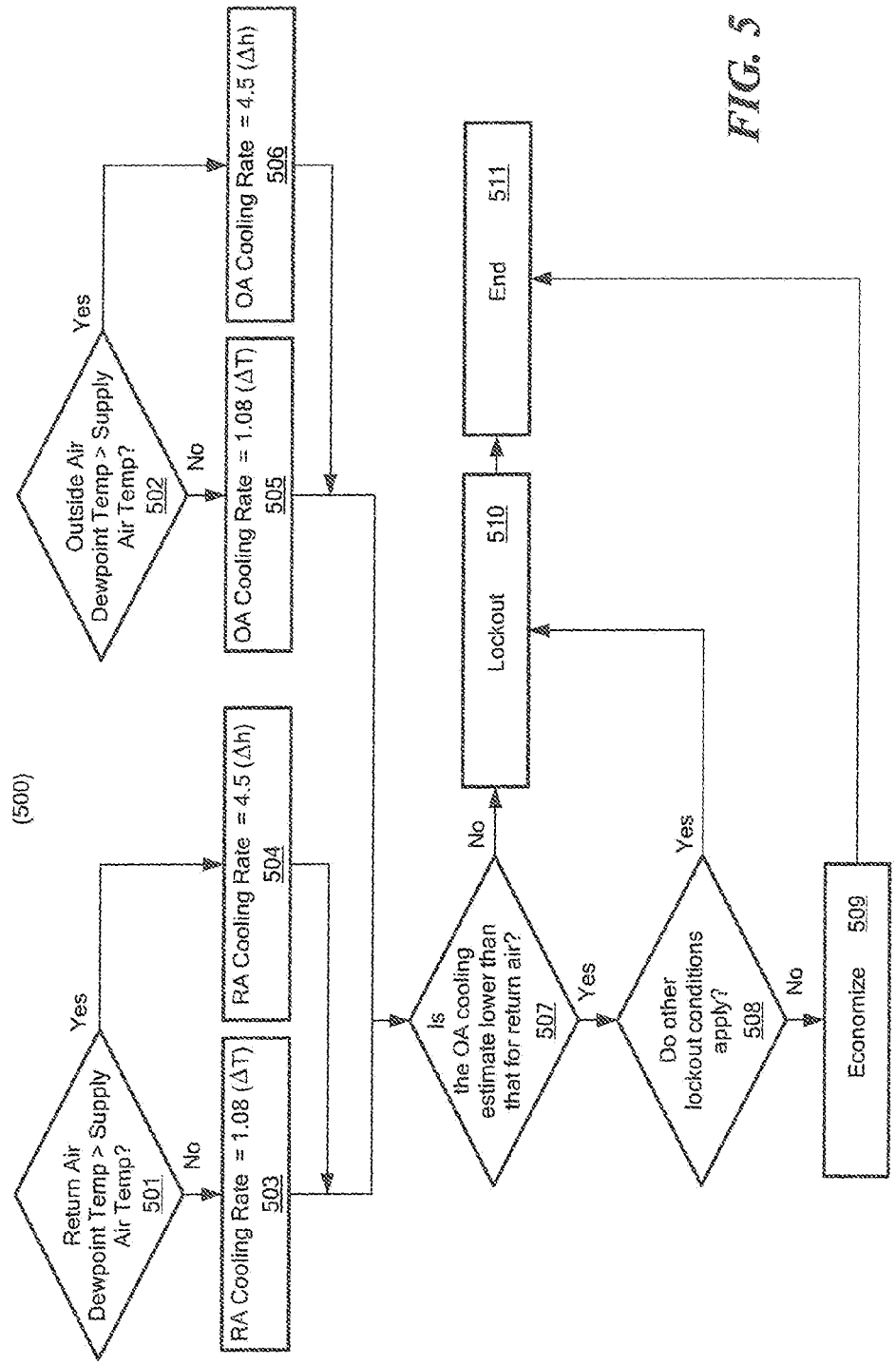
FIG. 5 is a flow diagram showing an exemplary sequence of steps for controlling a ventilation system economizer in accordance with exemplary embodiments of the invention.

FIG. 5 shows an exemplary sequence of steps 500 for generating an economizer lockout signal in accordance with exemplary embodiments of the invention. In one embodiment, the processing 500 to generate the lockout signal is performed by the central controller 404 (FIG. 4) as a part of system 400. In one particular embodiment, this arrangement is preferred because the processing described below includes signal conditioning, scaling, and significant programming.

In other embodiments, the processing is implemented in. AHU controls 316, which could form a part of a building automation system (BAS), or other system or device. Further, the processing of FIG. 5 could be implemented using a Programmable Logic Controller (PLC), or other programmable device that is not part of the AHU controls.

In step 501, the system determines if the return or outside air sources will be subject to latent cooling (testing for a wet coil condition) by comparing the dewpoint temperature of each air source (305 and 307) to the supply air temperature. The measurements can be made via a duct probe at location 405 through the node controller 401, or it could be measured through a separate probe 317 through AHU controls 316. In many cases it will be advantageous for the temperature measured by probe 405 or 317 to include what is known in the art as a duct averaging temperature sensor, which provides temperature measurements that are indicative of the average temperature of the air flowing through the duct or plenum cross section. This can be helpful, given the stratification that can take place as the return and outside airstreams mix, resulting in non-uniform temperature across a given cross section of the supply flow stream.

In a manner similar to step 501, a wet coil/dry coil test is accomplished for the outside air to source 307 in step 502. In other embodiments, in lieu of using actual measured supply air temperature in steps 501 and 502, one can use the supply air temperature setpoint which may include an assumed value (for example 55 degrees F.) or an actual value that is read from the system that is responsible for controlling the supply air temperature of the AHU providing supply air 314. For example, if the AHU controls 316 are responsible for is controlling the supply air temperature, the current setpoint (which is often a variable) could be conveyed through a network connection 405, such as via. BACnet. This information can be dynamically inserted into the processing of FIG. 5, which is advantageous since supply air temperature setpoints are often varied as cooling load conditions within a building vary influencing when it is best to operate the economizer. For example, the temperature setpoint in some systems may be increased during evening hours when the cooling load within a building is generally lower. In other cases the supply air temperature setpoint may be varied seasonally, so that there is a higher temperature setpoint during colder months and a lower temperature setpoint during warmer months. In cases where the supply air temperature setpoint will be substantially different than that when the economizer is enabled, then the anticipated setpoint that will prevail as the economizer is enabled should be used.

After the measurements in steps 501 and 502, the system estimates the cooling load presented by each air source to create a comparable measurement indicative of the energy associated with conditioning each that can be used to assess whether or not the economizer should be enabled. If the outcome of the test for a wet coil condition is "yes", then the approximation of the cooling load associated with the respective air source needs to include both a sensible and latent energy term. Those who are skilled in the art of psychrometrics will recognize that one way to simultaneously account for both sensible and latent energy is by way of an enthalpy measurement. Further, in order to understand both the sensible and latent cooling provided by cooling coil 313, one can calculate the enthalpy difference between the air source and supply air 314. Here, the supply air enthalpy is approximated by considering that this state is a wet coil condition and, therefore, with that knowledge and the knowledge of the supply air temperature (or, alternatively, the supply air temperature setpoint), the expected supply air enthalpy under this condition (predicted wet coil enthalpy) can be calculated. As an example of how the predicted wet coil enthalpy can be calculated, the following equations can be used:

$$h(\text{BTU/lb}) = 0.240 T_{sa} + W_{lb}(1061 + 0.444 T_{sa}) \quad (\text{Eq. 1})$$

where, h=enthalpy in BTU/lb, $T_{sa}$=Supply Discharge Temp (deg F.), and $W_{lb}$=humidity ratio in units of pounds water per pound of dry air. The humidity ratio can be calculated as follows:

$$W(lbw/lba) = .62198 * \left[\frac{p_{wsd}}{p_{bar} - p_{wsd}}\right] \quad (\text{Eq 2})$$

where, Pwsd=saturation vapor pressure at the dew point temperature in psia. Pwsd can be evaluated using Equation (3) for Pbar=barometric pressure in psia. (assume 14.64 psia)

Saturation vapor pressure in psia may be calculated using the following Hyland-Wexler equation taken from the ASHRAE Fundamentals Handbook:

$$P_{wsd} = e^{C_8/T + C_9 + C_{10}T + C_{11}T^2 + C_{12}T^3 + C_{13}\ln T} \quad (\text{Eq 3})$$

where, T=supply dewpoint Temp in ° R=T sa_sat temp (deg F.)±459.67,
C8=−1.0440397E+04,
C9=71.1294650E+01,
C10=−2.7022355E−02,
C11=1.2890360E−05,
C12=−2.4780681E−09,
C13=6,5459673E+00,
e=natural log base As noted above, the objective here is to create a comparable measurement that is indicative of the cooling load presented by each air source for both dry-coil and wet-coil conditions. One consideration is to be able to handle the case where one air source (305 or 307) is subject to latent cooling while the other (305 or 307) is subject to sensible cooling, and to be able to compare the two with the same unit of measurement. One convenient unit of measurement germane to this process is energy rate as a function of volumetric flow rate. For example, the energy associated with either sensible cooling or a cooling process involving both sensible and latent cooling can easily be converted to units of BTUs/Hour per CFM. Using this approach, when there is a wet coil condition a comparable cooling rate measurement of BTUs/Hour per CFM can be calculated using the enthalpy difference between the air source 305 or 307 and the anticipated supply air enthalpy (using equation 1) by way of the following equation (equation 4):

$$\text{Cooling Rate} = 4.5(\Delta h) \text{ BTU's per hour per CFM} \quad (\text{Eq 4})$$

where, Δh=air source enthalpy minus anticipated supply air enthalpy.

Further, when there is a dry coil condition a comparable cooling rate measurement of BTUs/Hour per CFM can be calculated using the dry-bulb temperature difference between the air source 305 or 307 and the anticipated supply air dry-bulb temperature by way of the following equation (equation 5):

$$\text{Cooling Rate} = 1.08 (\Delta T) \text{ BTU's per hour per CFM} \quad (\text{Eq 5})$$

where, ΔT=air source dry-bulb temperature minus anticipated supply air dry-bulb temperature.

Referring again to FIG. 5, the application of Equation 4 to estimate a comparable measurement of cooling rate when there is a wet coil condition is illustrated as logic steps 504 and 506. For dry coil conditions, logic steps 503 and 505 utilize Equation 5. More particularly, step 503 is the return air dry coil determination (no path) from step 501 and step 504 is the return air wet coil determination (yes path) from step 501. Similarly, step 505 is the outside air dry coil determination from step 502 and step 506 is the outside air wet coil determination from step 502.

Once the cooling rate has been estimated for the outside air source 307 and the return air source 305, the outside air and return air cooling rate values are compared in step 507 to determine if the outside air cooling rate estimate is less than that of the return air. If not, then the economizer will be locked out or disabled in step 510. If, on the other hand, the estimated cooling rate for the outside air is less than that of the return air, it may be economical to enable the economizer, barring other potential lockout conditions as determined in step 508.

Exemplary lockout conditions for step 508 include a provision for freeze protection and other conditions well known to one of ordinary skill in the art. It is understood that in colder climates there can be conditions where the outside air is simply too cold to operate an economizer. This is due to the limitations of the effectiveness with which the return air and outside air are mixed, giving rise to stratified layers of unmixed air that can enter the AHU. When it is very cold outside, particularly when it's below freezing temperatures, these stratified layers of air can damage the cooling cool 313. Therefore, to avoid this, the economizer can be locked out when it is below freezing temperatures outside.

If there is no lockout condition, in step 509 the economizer is enabled. It is understood that any practical signal well known to one of ordinary skill in the art can be used to enable or disable the economizer. Exemplary signal communication includes, but is not limited to, a command sent through BACnet over communication link 405 to the AHU controls, which contain the economizer function. A similar command can be sent over a network (such as 405) connecting directly or indirectly to the system that performs the economizer function. Alternatively, an enabling signal can be relay contact or other signal which connects to an input on the control, device for economizer control.

Figure 6:
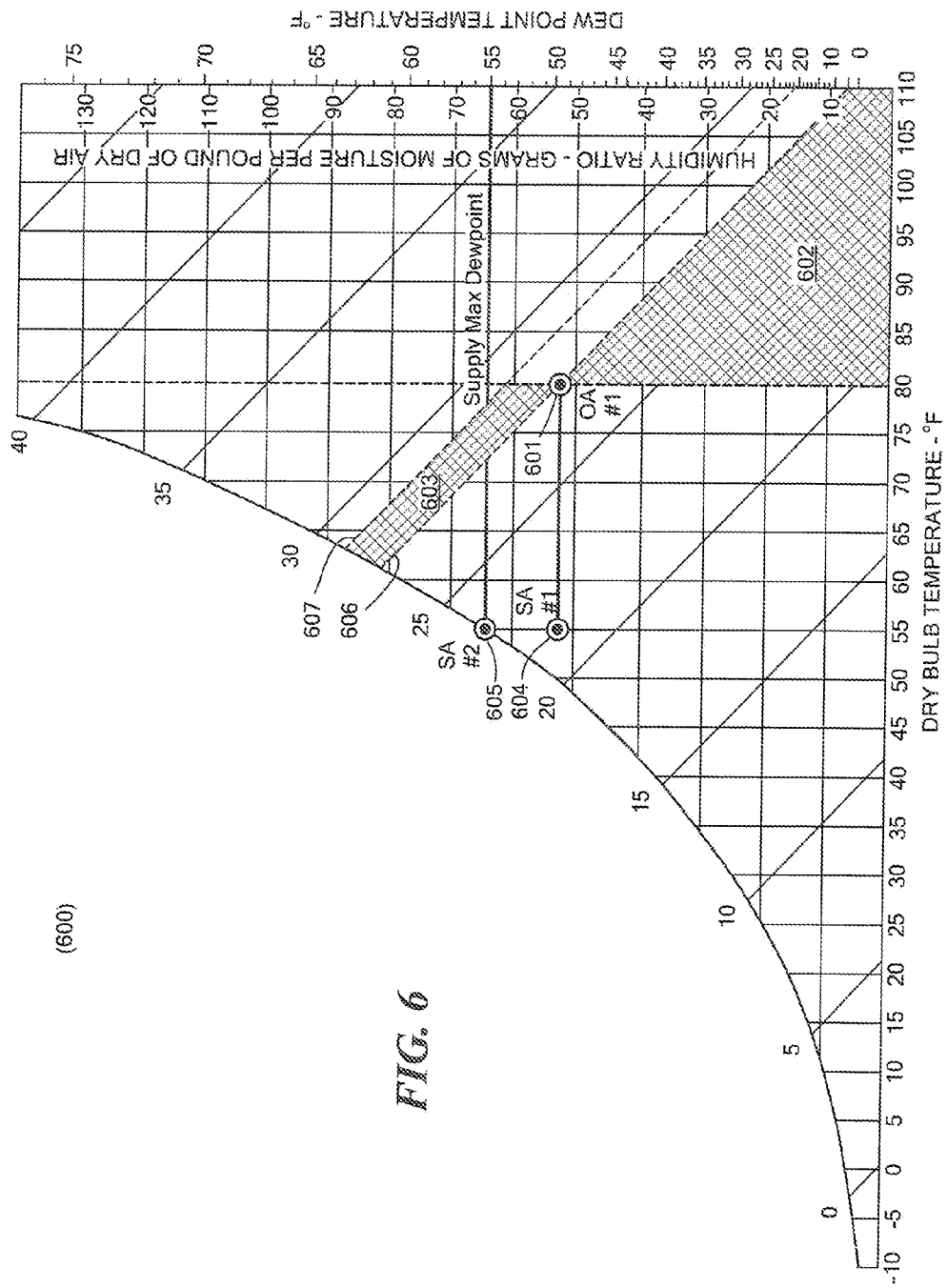
FIG. 6 is a graphical representation of suboptimal operation of an economizer.

Exemplary embodiments of the invention provide significant advantages over prior art differential enthalpy economizers, particularly during certain dry-coil conditions where the enthalpy difference between return air and outside air is not representative of which air source presents the greatest cooling load, as illustrated in FIG. 6. As an example, for the illustrated thy coil outside air condition 601 (80 degrees F. dry-bulb and 50 degrees F. dewpoint temperature), a differential enthalpy measurement incorrectly disables the economizer for any combination of drier and warmer return air conditions signified by region 602, which is bounded by dry-bulb temperature line 608 (the dry-bulb temperature of outside air 601) and enthalpy line 606 (the enthalpy of outside air 601 which, in this case is 27.6 BTUs/lb).

Region 603 illustrates, for the outside air condition 601, the cooler and moister return air conditions where the economizer would be incorrectly enabled using the prior art differential enthalpy approach. Region 603 is bounded by outside air dry-bulb temperature 608, outside air enthalpy 606, and enthalpy line 607. Enthalpy line 607 is the enthalpy at which the return air cooling load under wet-coil conditions (which may be calculated using equation 4) is equal to the cooling load presented by outside air 601 (which in this case may be calculated using equation 5). It should be noted that a portion of region 603 includes dewpoint temperatures above the supply maximum dewpoint, where a wet-coil condition would result, yet, the outside air condition 601 is not one that would result in a wet-coil condition. Thus, it can be seen that unless both air sources will create a wet coil condition, the differential enthalpy approach can result in erroneous economizer hours.

Sikh errors are addressed in exemplary embodiments of the invention which properly estimate the cooling load presented by the outside air and return air, regardless of the state of each air source.

Figure 7:
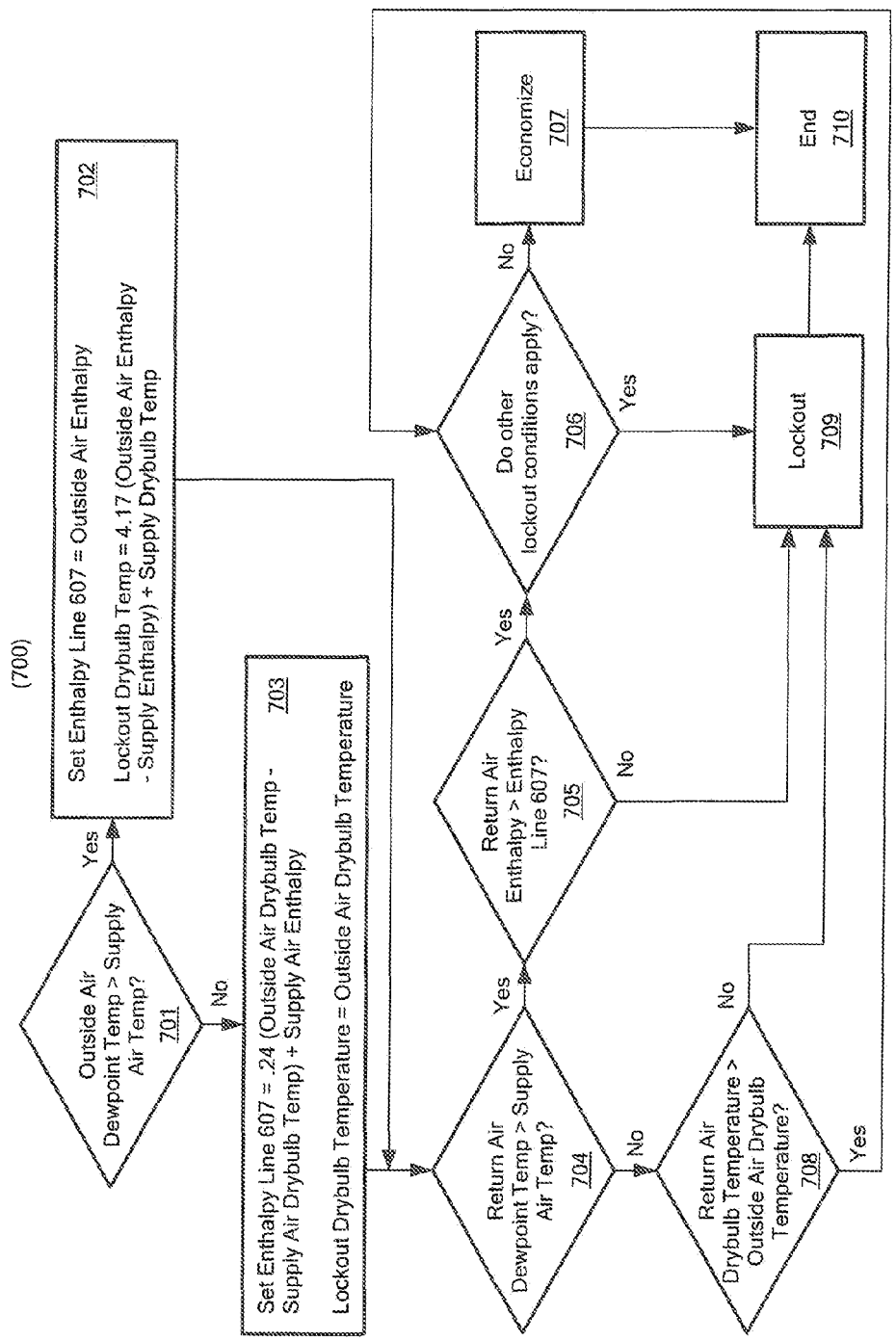
FIG. 7 is a flow diagram showing an exemplary sequence of steps for addressing the suboptimal economizer operation of FIG. 6.

In one embodiment of the invention, regions 602 and 603 of FIG. 6 can be dynamically compensated for, at various values of outside air condition 601, using a differential enthalpy approach based on an estimated lockout enthalpy value for return air wet-coil conditions and a differential dry-bulb approach based on an estimated lockout dry-bulb temperature value for return air dry coil conditions, as shown in FIG. 7.

In general, processing 700 is such that when the return air source 305 results in a wet-coil condition, the system performs an enthalpy comparison between the return air 305 enthalpy and enthalpy line 607 (a calculated effective enthalpy lockout value based on outside air cooling load) in order to establish if the economizer should be enabled. When the return air 305 results in a dry coil condition, the return air 305 is compared to an estimated effective dry-bulb lockout value based on outside air 307 cooling load.

In step 701, the system determines if the outside air 307 will result in a wet-coil or a dry-coil condition. This is again based on whether the outside air dewpoint temperature exceeds the supply air 317 dry-bulb temperature, or in an alternate embodiment, the supply air 314 temperature setpoint. If the outside air 307 results in a wet-coil condition, then in step 702 the enthalpy lockout value (enthalpy line 607) is set equal to the outside air 307 enthalpy. If it is determined that the outside air 307 results in a wet-coil condition, the lockout dry-bulb temperature is calculated based on Equation 6 below, which determines the return air (305) dry-bulb temperature at which the return air cooling load is equivalent to the cooling load presented by the outside air (307).

Lockout Drybulb Temperature=4.17 (Outside Air Enthalpy–Apply Air Enthalpy+Supply Air Drybulb Temperature (Eq. 6)

If the outside air results in a dry-coil condition, then the return air dry-coil dry-bulb lockout value is equivalent to the outside air thy-bulb temperature. Also, if the outside air results in a dry-coil condition, then the enthalpy lockout value (enthalpy line 607) is calculated based on the following equation (Equation 7), as shown in step 703, which determines the wet-coil return air (305) enthalpy value at which the return air cooling load is equal to the cooling load presented by the outside air.

Enthalpy Lockout Value=0.24(Outside Air Drybulb Temperature–Supply air Drybulb Temperature+ Supply Air Enthalpy (Eq. 7)

Once the enthalpy and dry-bulb lockout values have been established in steps 702 or 703, based on the outside air 307 producing a wet-coil or dry-coil condition, respectively, in step 704 the system determines whether the return air 305 will produce a wet-coil or dry-coil condition. This is again based on whether the return air dewpoint temperature exceeds the supply air 317 dry-bulb temperature, or, as an alternate embodiment, the supply air 314 temperature setpoint.

If step 704 establishes that the return air 305 will produce a wet-coil condition then in step 705 the system determines if the return air enthalpy exceeds enthalpy line 607 (the enthalpy lockout value). If not, then the return air cooling load is less than that of the outside air 307, and the economizer will be locked out via step 709. If the return air enthalpy does exceed enthalpy line 607, then the return air cooling load will be greater than that of the outside air 307, and the economizer will be enabled in step 707, assuming other lockout conditions do not exist as determined in step 706.

If it is determined that the return air 305 will result in a dry-coil condition, then in step 708 the system compares the return air 305 dry-bulb temperature to the lockout dry-bulb temperature established by step 702 or 703, if not, then the cooling load presented by the return air 305 is less than that presented by the outside air 307, and the economizer will be locked out in step 709. If the return air dry-bulb temperature does exceed the lockout dry-bulb temperature, then the cooling load presented by the return air 305 is greater than that presented by the outside air 307, and the economizer will be enabled in step 707, assuming other lockout conditions do not apply, as evaluated in step 706.

Figure 8:
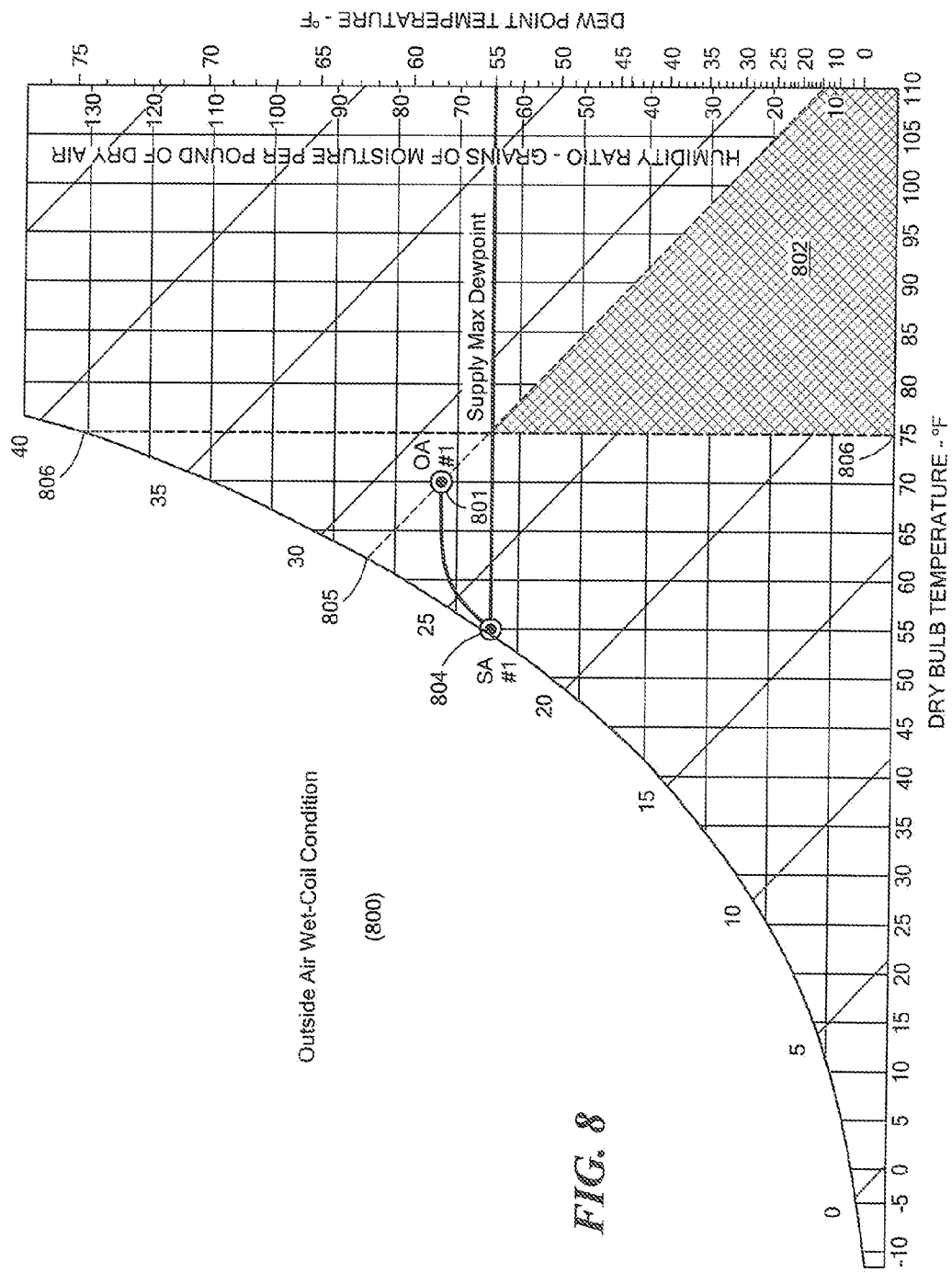
FIG. 8 is a graphical representation of the functionality of the processing in FIG. 7.

FIG. 8 further illustrates the functionality of FIG. 7. In this example, the outside air 307 would result in a wet coil condition, given that its dewpoint temperature exceeds the maximum supply air dewpoint temperature (the supply air temperature). The outside air state is depicted by 801 which, for this example, is at 70 degrees Fahrenheit (dry-bulb temperature) and 58 degrees Fahrenheit (dewpoint temperature). This corresponds with an enthalpy value of about 28 BTUs/pound of dry air, and this enthalpy line is drawn as 805. From processing 700, because in this case the outside air source 307 will result in a wet-coil condition, the enthalpy line 607 will be equal to enthalpy line 805. This means that for return air conditions that result in a wet coil, the economizer will be enabled when the return air source 305 enthalpy exceeds that of the outside air; again, depicted by enthalpy line 805 which, in this example is the enthalpy lockout value.

For the outside air condition 801, the lockout dry-bulb temperature (calculated within 702 and equation 6) is approximately 75 degrees Fahrenheit, depicted as 806. This means that for return air conditions that result in a dry coil., according to processing 700, the economizer will be enabled when the return air source 305 dry-bulb temperature exceeds 75 degrees Fahrenheit.

Also, shown is shaded region 802, which is bounded by enthalpy line 805 and dry-bulb temperature line 806. Region 802 represents the range of return air 305 conditions which are drier and warmer than the stated outside air condition 801 for which the prior-art differential enthalpy changeover logic will produce erroneous results. Within this region 802, the prior-art differential enthalpy changeover logic would incorrectly disable the economizer because any return air enthalpy value falling within region 802 is less than that of outside air 801 signified by 805. Not enabling the economizer when the return air conditions fall within region 802 results in a waste of energy because it requires more cooling energy to condition the return air 305 under any of these conditions than it does to condition outside air 801 to achieve supply air condition 804.

The dry-bulb and enthalpy lockout values that are calculated from equations 6 and 7 as a part of processing 700, illustrate the adaptive nature of exemplary embodiments of the invention, as these parameters are highly variable with outside air and supply air conditions. This illustrates the deficiencies of the prior-art differential dry-bulb and differential enthalpy changeover approaches, which do not compensate for dry or wet coil conditions or account for the conditions where the return air results in a wet coil conditions while the outside air results in a dry-coil condition, and vice versa.

Prior-art solid state enthalpy controllers, such as that described within U.S. Pat. No. 3,949,607 attempt to provide a hybrid lockout curve (sometimes called a combination high-limit) that approaches a fixed enthalpy line at certain high relative humidity conditions and a fixed dry-bulb temperature line at low relative humidity conditions, but does not take the dynamic supply air conditions into account. The '607 patent also does not properly account for the return air conditions, particularly as it relates to dry and wet coil operation. Further, prior art solid state enthalpy controllers do not adaptively adjust the enthalpy dry-bulb lockout curve as outside air and supply air conditions vary which, aside from sensor accuracy issues, can result in substantial energy waste. Further, due to the dynamic nature of the enthalpy lockout value and lookout dry-bulb temperature calculated within 702 and 703 based on wet or dry coil conditions, exemplary embodiments of the invention provide a variable combination high-limit curve that, in one embodiment, will vary with outside air conditions and wet or dry coil conditions or, conversely, adapted to provide a variable combination high-limit curve that will vary with return air conditions and wet or dry coil conditions.

It is understood that the exemplary processing 700 of FIG. 7 is one of many possible methods that can be used to create a highly accurate economizer changeover signal. Other alternative embodiments will become apparent to one of ordinary skill in the art without departing from the scope of the present invention. For example, in one alternate embodiment of the invention, instead of calculating the enthalpy and dry-bulb lockout values based on the outside air conditions 601, one can conversely create these lockout parameters based upon return air conditions. In this embodiment, in step 701 the system checks to see if the return air source 305 results in a wet or dry coil condition and, processing in steps 702 and 703 establishes the enthalpy and dry-bulb lockout values that the outside air can be compared against in order to establish whether or not to enable or disable the economizer.

Figure 9:
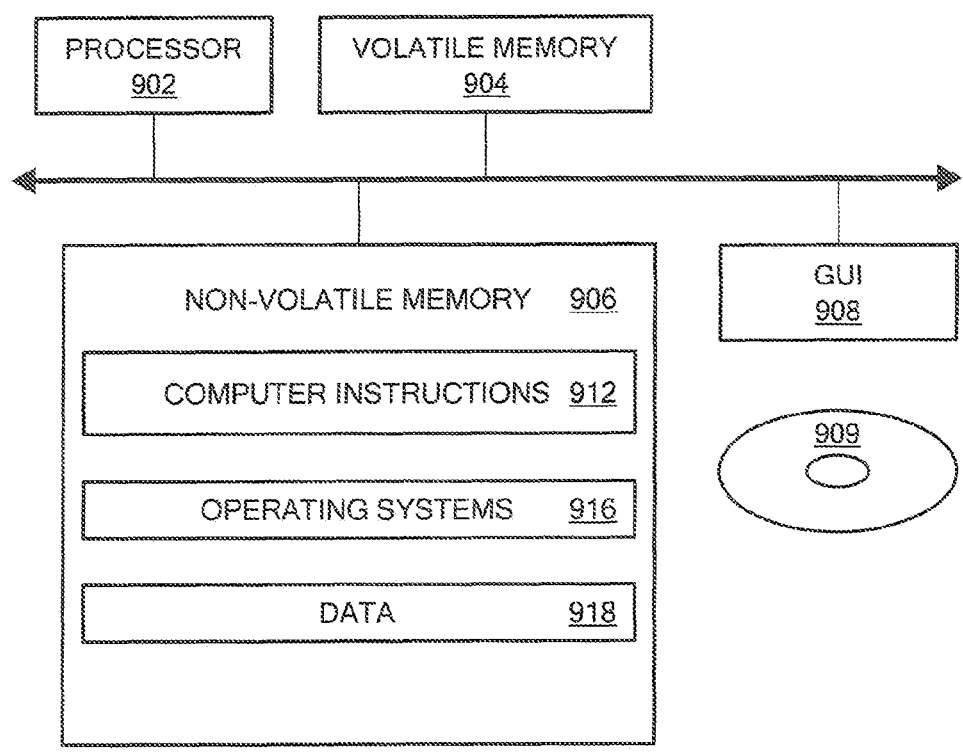
FIG. 9 is a schematic representation of an exemplary computer that can perform at least a portion of the processing shown in FIGS. 5 and 7.

Referring to FIG. 9, a computer includes a processor 902, a volatile memory 904, a non-volatile memory 906, and a graphical user interface (GUI) 908 (e.g., a mouse, a keyboard, a display, for example). The non-volatile memory 906 stores computer instructions 912, an operating system 916 and data 918. In one example, the computer instructions 912 are executed by the processor 902 out of volatile memory 904 to perform all or part of the processing, such as processing 500 and 700. In one embodiment, a disk 909 comprises a machine-readable medium that stores executable instructions to implement processing, such as processing 500 and 700. It is understood that processing 500 and 700 are exemplary processing embodiments and that other embodiments comprising other processing at least partly performed by the computer are within the scope of the invention. In one embodiment, the computer of FIG. 9 is a part of the sensor suite and central controller 404.

Processing 500 and 700 are not limited to use with the hardware and software of FIG. 9; they may find applicability in any computing or processing environment and with any type of machine or set of machines that is capable of running a computer program. Processing 500 and 700 and/or other processing may be implemented in hardware, software, or a combination of the two. Processes 500 and 700 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform process 500 and/or process 700 and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processes 500 and 700. Processes 500 and 700 may also be implemented as a machine-readable storage medium, configured with a computer program, where upon execution, instructions in the computer program cause the computer to operate in accordance with processes 500 and 700.

The processes described herein are not limited to the specific embodiments described. For example, the processes 500 and 700 are not limited to the specific processing order of FIGS. 5 and 7, respectively. Rather, any of the processing blocks may be re-ordered, combined or removed, performed. In parallel or in serial, as necessary, to achieve the results set forth above, The processing blocks in FIGS. 5 and 7 associated with implementing the system may be performed by one or more programmable processors executing one or more computer programs to perform the functions of the system. All or part of the system may be implemented as, special purpose logic circuitry (e.g., FPGA (field programmable gate array) and/or ASIC (application-specific integrated circuit)). A variety of configurations having various hardware and software partitions will be readily apparent to one of ordinary skill in the art.

Figure 10:
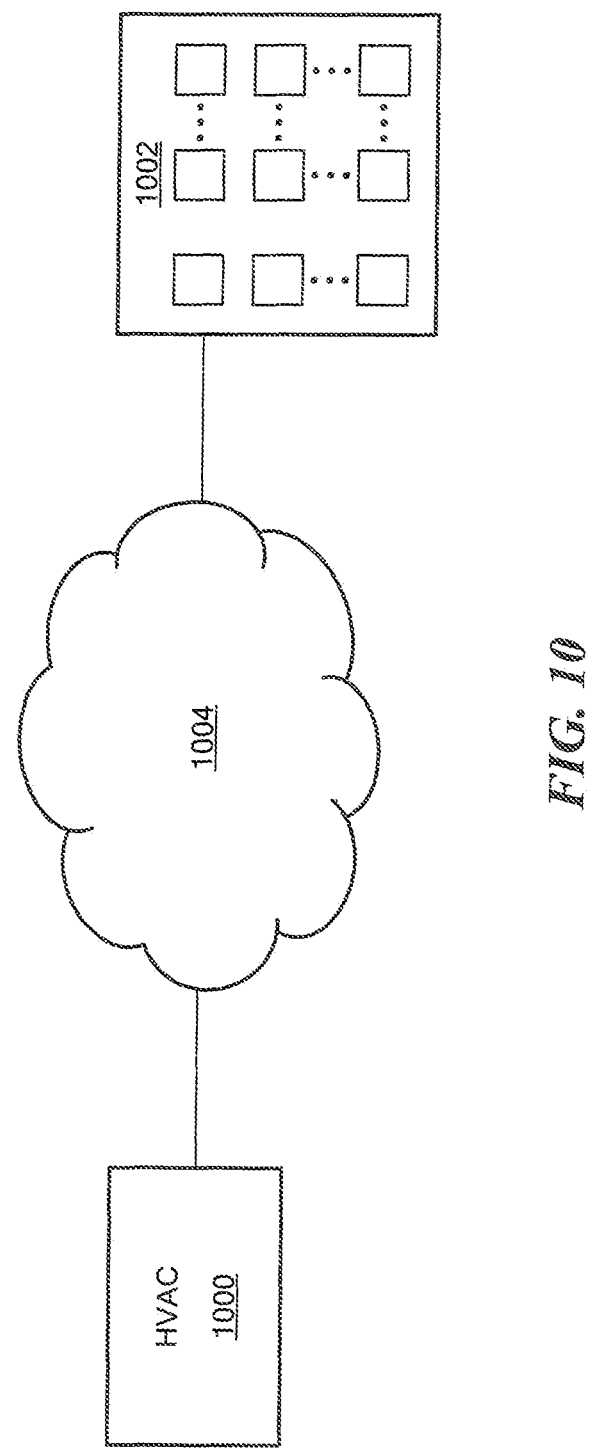
FIG. 10 is a schematic representation of an exemplary HVAC system coupled to a processing environment in a cloud configuration.

As shown in FIG. 10, in one embodiment an HVAC system 1000 is coupled to a remote processing environment 1002 via a network 1004, in a so-called cloud configuration. The processing environment 1002 performs the processing, such as processing 500 and 700, to generate control signals for controlling an economizer. The processing environment 1002 includes an article, such as a non-volatile memory, containing stored instructions that enable a machine, such as HVAC system 1000, to control an economizer in accordance with exemplary embodiments of the invention. It is understood that an article containing non-transitory stored instructions can comprise any memory that can form a part of a system, as well as a disk.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method of controlling an economizer in a ventilation system, comprising:
    measuring a moisture related property of a first input air source to determine if conditioning of the first input air source to a desired output air temperature results in a wet-coil or a dry-coil condition;
    measuring a moisture related property of a second input air source to determine if conditioning of the second input air source to the desired output air temperature results in a wet-coil or a dry-coil condition;
    determining a moisture related lockout value and a dry-bulb temperature lockout value based on a cooling load presented by the first input air source;
    comparing the measured moisture related property of the second input air source to the moisture related lockout value if the conditioning of the second input air source results in a wet-coil condition;
    comparing the measured dry-bulb temperature of the second air source to the dry-bulb temperature lockout value if the conditioning of the second air source results in a dry-coil condition; and
    selectively enabling the economizer based upon the comparisons to the moisture related lockout value and the dry-bulb temperature lockout value.

2. The method according to claim 1, wherein the first input air source corresponds to outside air and the second input air source corresponds to return air.

3. The method according to claim 1, wherein the first input air source corresponds to return air and the second input air source corresponds to outside air.

4. The method according to claim 1, wherein the moisture related property of the first and second input air source measured to determine if a wet-coil condition results includes dewpoint temperature.

5. The method according to claim 1, wherein the moisture related lockout value is calculated as the enthalpy value that when compared to an estimate of the supply air enthalpy is indicative of the energy associated with conditioning the first input air source.

6. The method according to claim 5, wherein the measured enthalpy of the second input air source is compared to the enthalpy lockout value, when it is determined that the conditioning of the second input air source results in a wet-coil condition.

7. The method according to claim 6, wherein the first input air source is outside air and the second air source is return air, and the economizer is enabled when the return air enthalpy exceeds the enthalpy lockout value.

8. The method according to claim 1, wherein the dry-bulb temperature related lockout value is calculated such that, when compared to an estimate of the supply air dry-bulb temperature, is indicative of the energy associated with conditioning the first input air source.

9. The method according to claim 8, wherein the measured dry-bulb temperature of the second input air source is compared to the dry-bulb temperature lockout value, when the conditioning of the second input air source results in a thy-coil condition.

10. The method according to claim 9, wherein the first air source is outside air and the second air source is return air, causing the economizer to be enabled when the return air dry-bulb temperature exceeds the dry-bulb temperature lockout value.

* * * * *